(12) United States Patent
Zhu et al.

(10) Patent No.: US 10,618,144 B2
(45) Date of Patent: Apr. 14, 2020

(54) GRINDING METHOD AND OGS SUBSTRATE

(71) Applicants: HEFEI XINSHENG OPTOELECTRONICS TECHNOLOGY CO., LTD., Hefei, Anhui (CN); BOE TECHNOLOGY GROUP CO., LTD., Beijing (CN)

(72) Inventors: Wenlong Zhu, Beijing (CN); Zuliang Wang, Beijing (CN); Binbin Zhang, Beijing (CN); Wenjin Fan, Beijing (CN); Lei Zhang, Beijing (CN); Qingpu Wang, Beijing (CN)

(73) Assignees: HEFEI XINSHENG OPTOELECTRONICS TECHNOLOGY CO., LTD., Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/679,830

(22) Filed: Nov. 11, 2019

(65) Prior Publication Data
US 2020/0070304 A1 Mar. 5, 2020

Related U.S. Application Data

(62) Division of application No. 15/710,267, filed on Sep. 20, 2017.

(30) Foreign Application Priority Data

Sep. 21, 2016 (CN) .......................... 2016 1 0840042

(51) Int. Cl.
*H01L 21/00* (2006.01)
*B24B 49/04* (2006.01)
(Continued)

(52) U.S. Cl.
CPC .............. *B24B 49/04* (2013.01); *B24B 9/065* (2013.01); *B24B 9/12* (2013.01); *G06F 3/044* (2013.01);
(Continued)

(58) Field of Classification Search
CPC ............ H01L 27/3246; H01L 51/0005; H01L 51/0031; H01L 51/5012; H01L 51/56;
(Continued)

(56) References Cited

U.S. PATENT DOCUMENTS

| | | | |
|---|---|---|---|
| 2015/0059169 A1* | 3/2015 | Li | C03B 27/00 29/829 |
| 2015/0077946 A1* | 3/2015 | Wu | G06F 3/044 361/748 |

* cited by examiner

*Primary Examiner* — Brook Kebede
(74) *Attorney, Agent, or Firm* — Nath, Goldberg & Meyer; Joshua B. Goldberg

(57) ABSTRACT

An OGS substrate and a grinding method thereof are provided. The OGS substrate includes a base substrate, wherein a shielding pattern is formed inside a periphery region of the base substrate, a reference mark is formed above the shielding pattern, the grinding method comprises: grinding an edge of the base substrate to form a chamfer; identifying edges of the reference mark and the base substrate; calculating a position distance between an outer edge of the reference mark and the edge of the base substrate corresponding thereto based on the identified edges of the reference mark and the base substrate; judging whether the position distance is smaller than a first distance; if it is judged that the position distance is smaller than the first distance, stopping grinding; otherwise, continuing to grind.

11 Claims, 6 Drawing Sheets

(51) Int. Cl.
 *B24B 9/12* (2006.01)
 *B24B 9/06* (2006.01)
 *G06F 3/044* (2006.01)
(52) U.S. Cl.
 CPC .............. *G06F 2203/04103* (2013.01); *G06F 2203/04107* (2013.01)
(58) Field of Classification Search
 CPC B24B 9/12; B24B 49/04; C03B 27/00; C03C 17/002; G06F 3/041; G06F 2203/04103
 USPC .................................................... 438/5, 149
 See application file for complete search history.

GRINDING METHOD AND OGS SUBSTRATE

CROSS-REFERENCE TO RELATED APPLICATION

The present application claims priority to Chinese Patent Application No. 201610840042.5 filed on Sep. 21, 2016, entitled "a grinding method, an OGS substrate and a manufacturing method of an OGS mother substrate", the disclosure of which is hereby incorporated by reference in its entirety.

TECHNICAL FIELD

The present disclosure relates to a field of display technology, and particularly to a grinding method and an OGS substrate.

BACKGROUND ART

The One Glass Solution (OGS) touch screen has characteristics of lightness, thinness, excellent light transmission and so on, therefore the OGS technology has gradually become a dominant technology in the touch industry.

SUMMARY

In view of at least one of above problems in the prior art, a grinding method, an OGS substrate and a manufacturing method of an OGS mother substrate are provided.

To realize the above object, this disclosure provides a grinding method for grinding an edge of an OGS substrate, wherein the OGS substrate comprises a base substrate, a shielding pattern is formed inside a periphery region of the base substrate, a reference mark is formed above the shielding pattern, a color of the reference mark is different from that of the shielding pattern, and an orthographic projection of the reference mark on the base substrate falls into an orthographic projection of the shielding pattern on the base substrate, and wherein the method comprises:

grinding an edge of the base substrate so as to form a chamfer;

identifying an edge of the reference mark and the edge of the base substrate;

calculating a position distance between an outer edge of the reference mark and the edge of the base substrate corresponding to the outer edge of the reference mark based on the identified edges of the reference mark and the base substrate;

judging whether the position distance is smaller than a first distance;

in a case that it is judged that the position distance is smaller than the first distance, stopping grinding; and in a case that it is judged that the position distance is larger than or equal to the first distance, continuing to grind the edge of the base substrate.

Optionally, after it is judged that the position distance is smaller than the first distance, the grinding method further comprising:

judging whether the position distance is smaller than a second distance, wherein the second distance is smaller than the first distance, wherein in a case that it is judged that the position distance is larger than or equal to the second distance, it is identified that a grinding amount of the OGS substrate is normal, and in a case that it is judged that the position distance is smaller than the second distance, it is identified that the grinding amount of the OGS substrate is excessive.

Optionally, a width of the reference mark ranges from 100 μm to 200 μm.

Optionally, a color of the shielding pattern is black, and a color of the reference mark is white.

To realize the above object, the present disclosure provides an OGS substrate comprising:

a base substrate including a central region and a periphery region;

a touch structure formed in the central region; and a shielding pattern formed in the periphery region; and a reference mark formed above the shielding pattern, wherein a color of the reference mark is different from that of the shielding pattern;

an orthographic projection of the reference mark on the base substrate falls into an orthographic projection of the shielding pattern on the base substrate;

a chamfer is formed at an edge of the base substrate; and a position distance between an outer edge of the reference mark and the edge of the base substrate corresponding to the outer edge of the reference mark is within a first range.

Optionally, a width of the reference mark ranges from 100 μm to 200 μm.

Optionally, a color of the shielding pattern is black, and a color of the reference mark is white.

Optionally, the reference mark is of a multilayer structure of MoAlMo.

Optionally, the touch structure includes a touch electrode and a metal wire connected to the touch electrode, and wherein the reference mark is provided in a same layer as the metal wire.

Optionally, the reference mark includes a plurality of sub-marks separated from each other.

Optionally, the first range is from 200 μm to 250 μm.

To realize the above object, the present disclosure provides a manufacturing method of an OGS mother substrate, comprising steps of:

forming a shielding pattern on a base substrate, wherein the base substrate is divided into a plurality of substrate areas, each of which includes a central region and a periphery region surrounding the central region, and the shielding pattern is formed in the periphery region;

forming a touch structure in each central region on the base substrate; and forming a reference mark above the shielding pattern, wherein a color of the reference mark is different from that of the shielding pattern, and an orthographic projection of the reference mark on the base substrate falls into an orthographic projection of the shielding pattern on the base substrate.

Optionally, the step of forming the touch structure includes: forming a touch electrode and a metal wire connected to the touch electrode, and wherein the reference mark and the metal wire are formed by a single patterning process.

Optionally, the step of forming the reference mark above the shielding pattern further includes: forming the reference mark with a width ranging from 100 μm to 200 μm.

Optionally, the step of forming the reference mark above the shielding pattern further includes: forming the reference mark so that a position distance between an outer edge of the reference mark and an outer edge of the shielding pattern ranges from 100 μm to 200 μm.

Optionally, a color of the shielding pattern is black, and a color of the reference mark is white.

Optionally, the reference mark is of a multilayer structure of MoAlMo.

Optionally, the step of forming the reference mark above the shielding pattern further includes: forming the reference mark including a plurality of sub-marks separated from each other.

DETAILED DESCRIPTION OF THE EMBODIMENTS

In order to make a person skilled in the art understand solutions in the present disclosure better, a grinding method, an OGS substrate and a manufacturing method of an OGS mother substrate provided in the present disclosure will be described in detail below in conjunction with the accompanying drawings.

At present, a manufacturing process of an OGS touch screen includes a Sensor process procedure and an OGS process procedure. The Sensor process procedure mainly includes manufacturing a touch structure and manufacturing a first shielding pattern (a first screen printing). By the Sensor process procedure, an OGS mother substrate may be manufactured. The OGS process procedure mainly includes: cutting the OGS mother substrate, CNC (Computerized Numerical Control) grinding the OGS substrate, a second screen printing, a substrate strengthening and assembling a printed circuit board.

Figure 1:
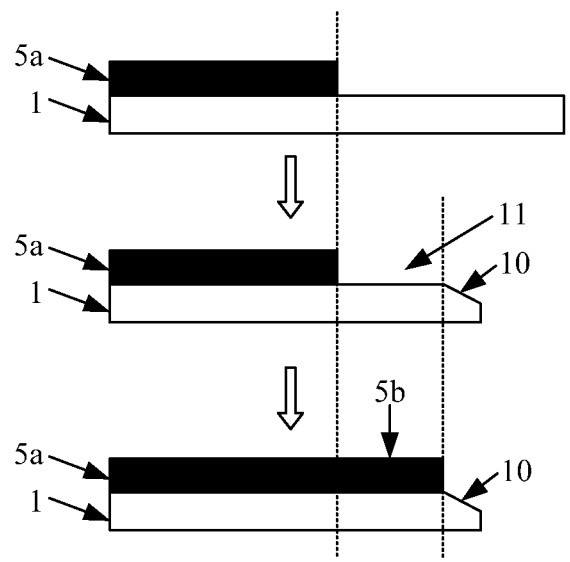
FIG. 1 is a diagram showing a CNC grinding process in the prior art.

FIG. 1 is a diagram showing a CNC grinding and a second screen printing. As shown in FIG. 1, after the CNC grinding is completed, forming a blank region 11 between positions corresponding to a first shielding pattern (first BM) 5a and a chamfer 10 on a base substrate 1; forming a second shielding pattern (second BM) 5b above the blank region 11 through a second screen printing so as to prevent light from leaking from periphery of the OGS substrate.

It is found in practical applications that, the process of the second screen printing is difficult, thus light leakage and ink pilling are likely caused and the defective rate of products is higher.

Figure 2:
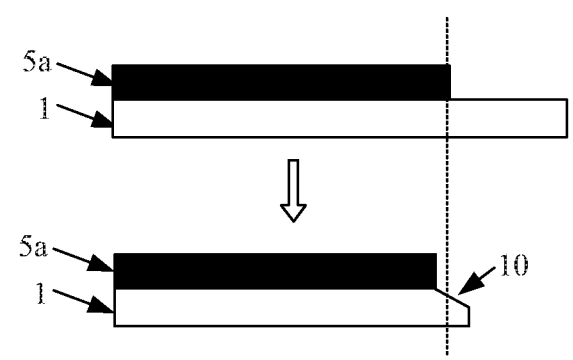
FIG. 2 is a diagram showing another CNC grinding process in the prior art.

FIG. 2 is a diagram showing another CNC grinding process. As shown in FIG. 2, in order to solve the above problems, a second BM Skip process (that is, the second screen printing process is skipped over) is introduced by the manufacturer. Specifically, during the first screen printing, the first BM 5a is designed to be larger, so that an edge of the first BM 5a is directly in contact with an edge of the chamfer 10 of the formed OGS substrate. In order to prevent light from leaking from periphery of the OGS substrate as much as possible, during the CNC grinding, the chamfer 10 of the formed OGS substrate may be continued to be ground off a small length after the edge of the chamfer has been in contact with the edge of the first BM 5a.

However, when monitoring the grinding amount of the CNC grinding process procedure by using a Charge Coupled Device (CCD), since the chamfer 10 and the first BM 5a both are exhibited as black in the CCD, after the chamfer 10 comes into contact with the first BM 5a, black is shown in the view filed of the CCD, it is difficult to continue to monitor the grinding amount of the OGS substrate, therefore, problems of excessive grinding amount and too small size of the formed OGS substrate are easy to occur.

First Embodiment

Figure 3:
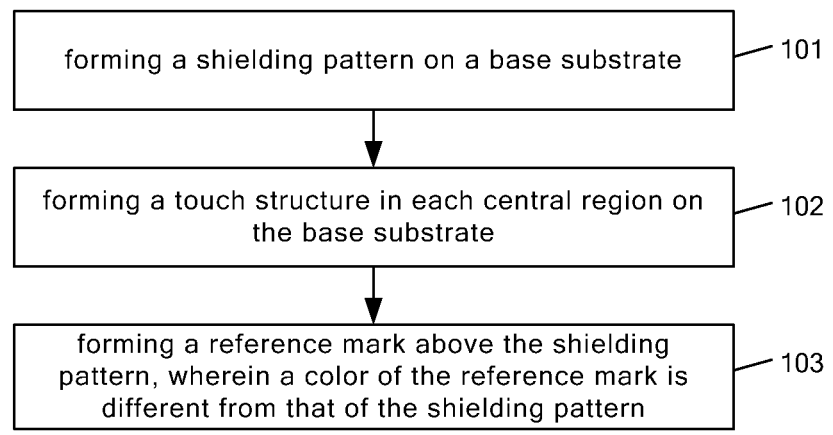
FIG. 3 is a flow chart of a manufacturing method of an OGS mother substrate in a first embodiment of the present disclosure.
Figure 4A:
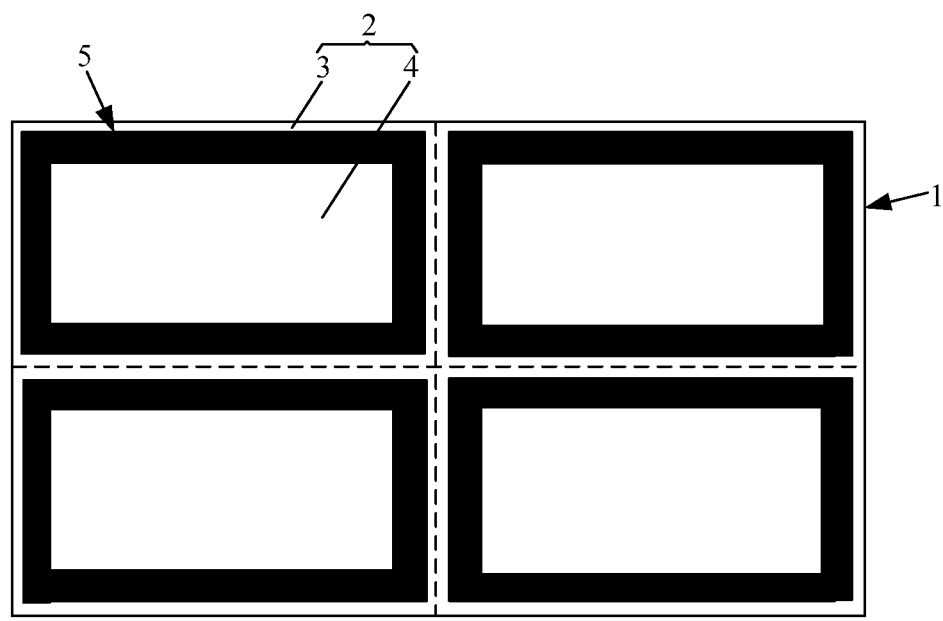
FIGS. 4a to 4c are diagrams showing various stages of manufacturing the OGS mother substrate by using the manufacturing method shown in FIG. 3.
Figure 4B:
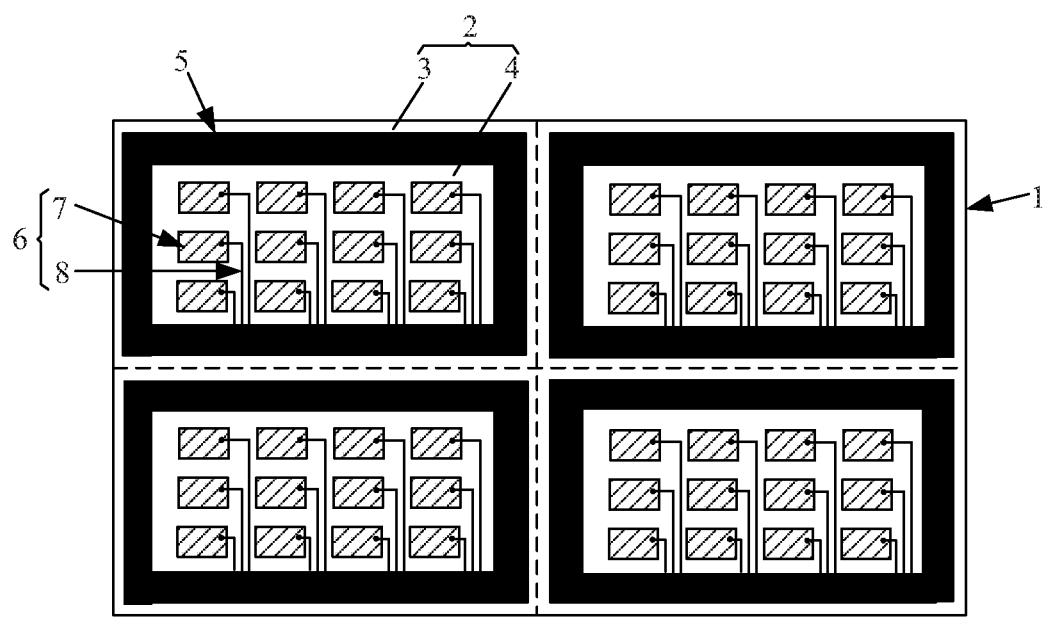
Figure 4C:
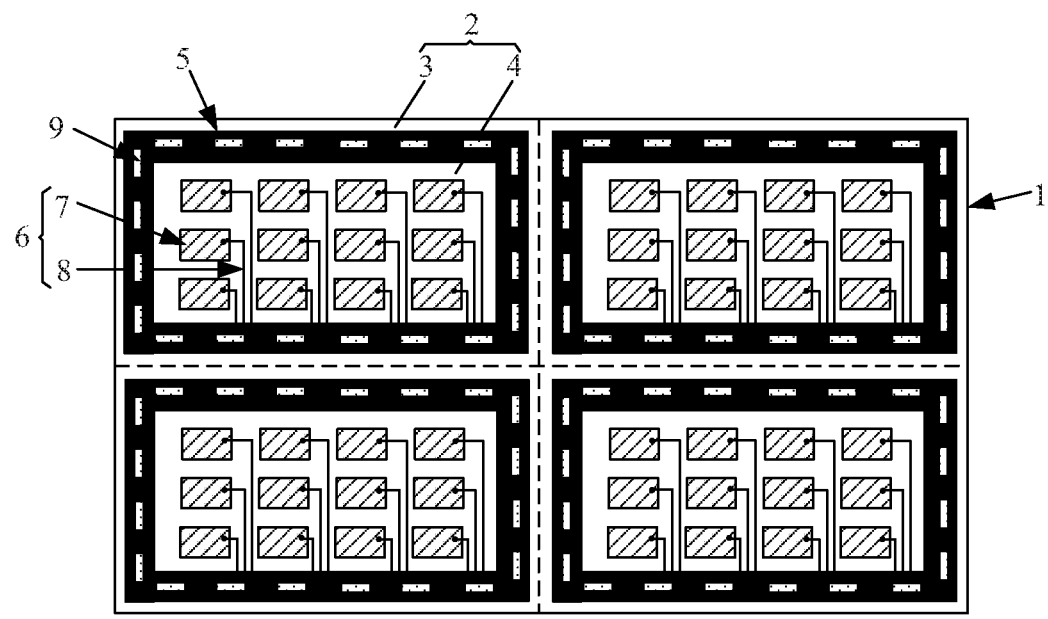
Figure 5:
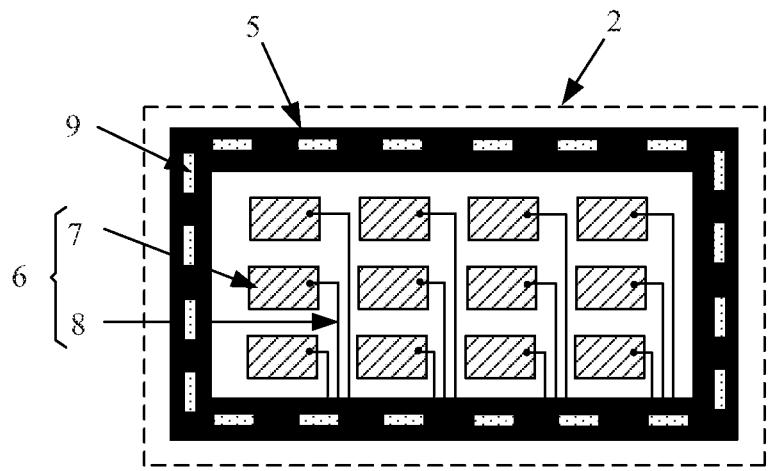
FIG. 5 is a top view of a substrate area shown in FIG. 4c.
Figure 6:
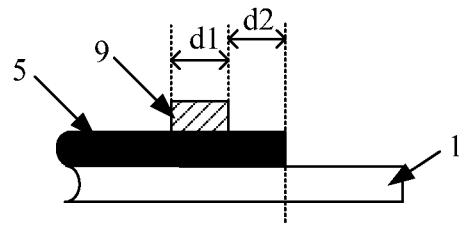
FIG. 6 is a cross sectional diagram showing a periphery region on one side of the substrate area shown in FIG. 5.

FIG. 3 is a flow chart of a manufacturing method of an OGS mother substrate in a first embodiment of the present disclosure; FIGS. 4a to 4c are diagrams showing various stages of manufacturing the OGS mother substrate by using the manufacturing method shown in FIG. 3; FIG. 5 is a top view of a substrate area shown in FIG. 4c; and FIG. 6 is a cross sectional diagram showing a periphery region on one side of the substrate area shown in FIG. 5. As shown in FIGS. 3 to 6, the manufacturing method of an OGS mother substrate comprises following steps 101 through 103.

Step 101, forming a shielding pattern on a base substrate.

With reference to FIG. 4a, the base substrate 1 is divided into a plurality of substrate areas 2 as required, each of the substrate areas 2 includes a central region 4 and a periphery region 3 surrounding the central region 4.

It should be noted that, a case of dividing one base substrate 1 into four substrate areas 2 as shown in drawings is just illustrative, but not to limit solutions of the present disclosure.

In the step 101, the shielding pattern 5 is formed in the periphery region 3 of each substrate area 2 through one patterning process. The shielding pattern 5 is used to prevent light from leaking from edges of the produced OGS substrate. In this embodiment, a distance between an outer edge of the shielding pattern 5 and an edge on a side, corresponding to the outer edge of the shielding pattern 5, of the substrate area 2 to which the shielding pattern 5 belongs is about 250 μm.

It should be noted that the patterning process in this disclosure specifically refers to a process including a photoresist coating, an exposure, a development, an etching, a photoresist peeling off and so on.

Optionally, the shielding pattern is made of black material.

A step 102, forming a touch structure in each central region on the base substrate.

As shown in FIG. 4b, a touch structure 6 is formed in the central region 4 of each of the substrate regions 2, the touch structure 6 includes: a touch electrode 7 and a metal wire 8 connected to the touch electrode 7. The metal wire 8 communicates a signal with the touch electrode 7 connected therewith so as to cooperate with the touch electrode 7 to recognize a touch.

It should be noted that, the touch electrode 7 in the figure is a self-capacitance touch electrode and is only illustrative, but not to limit the solutions in the disclosure. It should be known in the art that there is no limit to the type of the touch electrode 7 in the disclosure, the touch electrode 7 may be of a mutual-capacitance touch electrode or a touch electrode of another type in the prior art, which will not be described by taking examples.

Optionally, in this disclosure, the step 102 may be performed before the step 101.

A step 103, forming a reference mark above the shielding pattern, wherein a color of the reference mark is different from that of the shielding pattern.

With reference to FIG. 4c, the reference mark 9 is formed above the shielding pattern 5 through one patterning process, and the color of the reference mark 9 is different from that of the shielding pattern 5.

In this disclosure, by forming the reference mark 9, the color of which is different from that of the shielding pattern 5, above the shielding pattern 5, the reference mark 9 may provide a reference during the subsequent CNC grinding process, facilitating to monitor the grinding amount of the OGS substrate.

Optionally, in a case that the shielding pattern 5 is formed of a black material, the reference mark 9 may be made of a white material.

Optionally, in a case that the step 101 is performed before the step 102, the formation of the metal wire 8 on the base substrate 1 and the formation of the reference mark 9 above the shielding pattern 5 may be performed by a single patterning process. It can be seen from above that the OGS mother substrate including the reference mark 9 may be manufactured in the solution of the disclosure without changing the existing Sensor process procedure. Optionally, materials of both the metal wire 8 and the reference mark 9 are MoAlMo, that is, both the metal wire 8 and the reference mark 9 are of multilayer structures of MoAlMo, for example, each of the metal wire 8 and the reference mark 9 is formed of a first layer of Mo, a second layer of Al and a third layer of Mo, which are sequentially stacked together. The reference mark 9 of MoAlMo is white.

In order to clearly identify the reference mark 9 through a CCD during the CNC grinding process, a size of the reference mark 9 should be designed to be as large as possible. However, with the increase of the size of the reference mark 9, a cost of materials to be consumed is increased accordingly. With reference to FIG. 6, in this disclosure, in order to compromise between a difficulty for identifying the reference mark 9 and the material cost, optionally, a width d1 of the reference mark 9 ranges from 100 µm to 200 µm.

In addition, in the CNC grinding process, since the view field of the CCD is limited, in order to ensure that the CCD can view both the reference mark 9 and the edge of the OGS substrate simultaneously so as to monitor the grinding amount, it is required that a distance between the reference mark 9 and the edge of the OGS substrate cannot be too large, that is, the reference mark 9 should be close to an outer edge of the shielding pattern 5 as much as possible. However, in an actual grinding, in order to prevent light from leaking from edges of the OGS substrate as much as possible, generally, the grinding is continued to be performed for a while after the edge of the chamfer 10 is in contact with the edge of the shielding pattern 5, that is to say, a part of the outer edge of the shielding pattern 5 may be ground off. In this case, if the reference mark 9 is too close to the outer edge of the shielding pattern 5, then a part of the reference mark 9 will be ground off. In view of the above problem, with reference to FIGS. 5 and 6, in this disclosure, a distance d2 between the outer edge of the reference mark 9 and the outer edge of the shielding pattern 5 may be in a range of 100 µm~200 µm, thus it is ensured that the CCD can view the reference mark 9 and the edge of the OGS substrate simultaneously, and the reference mark 9 can be effectively prevented from being ground off.

It is found in a practical application that, in a case that the reference mark 9 is an enclosed rectangle frame provided in the periphery region 3 of the substrate area 2, electrostatic charges in the central region 4 of the substrate area 2 cannot pass through the enclosed reference mark 9, but gather in the central region 4. With the gather of the electrostatic charges in the central region 4, discharge is prone to occur in the central region 4 to breakdown electrical devices in the central region 4, leading to defects of the OGS substrate.

With reference to FIG. 5, in view of the above problem, the reference mark 9 is designed as a dispersion structure including a plurality of sub-marks separated from each other in this disclosure. In this case, the electrostatic charges in the central region 4 may disperse through intervals between the sub-marks, avoiding the gather of the electrostatic charges.

The first embodiment provides a manufacturing method of an OGS mother substrate, by forming the reference mark, the color of which is different from the shielding pattern, above the shielding pattern, the reference mark may provide a reference during the subsequent CNC grinding process, facilitating to monitor the grinding amount of the OGS substrate.

Second Embodiment

Figure 7:
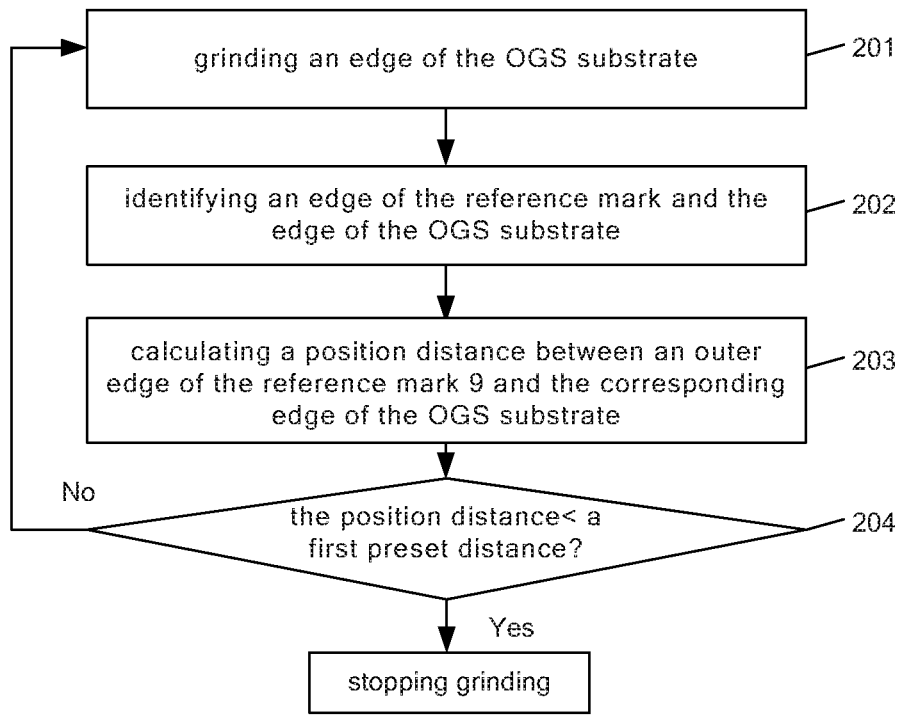
FIG. 7 is a flow chart of a grinding method provided in a second embodiment of the present disclosure.
Figure 8:
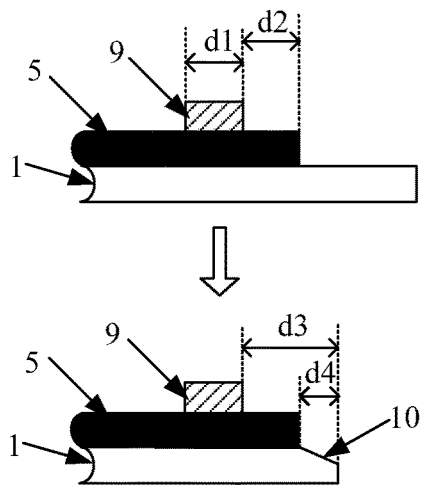
FIG. 8 is a diagram showing a case that an edge of the OGS substrate is being ground in the present disclosure.

FIG. 7 is a flow chart of a grinding method provided in a second embodiment of the present disclosure, and FIG. 8 is a diagram showing a case that an edge of the OGS substrate is being ground in the present disclosure. As shown in FIGS. 7 and 8, this grinding method is used to perform a CNC grinding on a edge of an OGS substrate, wherein the OGS substrate may be obtained by cutting an OGS mother substrate manufactured by the manufacturing method provided in the above first embodiment, the OGS substrate comprises: a base substrate 1, wherein a shielding pattern 5 is formed inside a periphery region 3 of the base substrate 1, a reference mark 9 is formed above the shielding pattern 5, an orthographic projection of the reference mark 9 on the base substrate 1 falls into an orthographic projection of the shielding pattern 5 on the base substrate 1, and a color of the reference mark 9 is different from that of the shielding pattern 5. The grinding method comprises following steps 201 through 204.

Step 201, grinding an edge of the OGS substrate to form a chamfer.

In the step 201, the edge of the OGS substrate (that is, the base substrate 1) is ground through a grinding apparatus to form a chamfer, wherein a width of the chamfer is about 100 µm.

Step 202, identifying an edge of the reference mark and the edge of the OGS substrate.

In the step 202, the periphery region 3 of the OGS substrate is viewed through a CCD, at this time, the chamfer 10 and the shielding pattern 5 are exhibited as black in the CCD (if there is a blank region on the OGS substrate, then the blank region is white), the reference mark 9 is not exhibited as black, therefore the edges of the reference mark 9 and the OGS substrate can be distinguished through the CCD.

In this embodiment, in order to facilitate the CCD to identify and distinguish the edges of reference mark 9 and the OGS substrate, optionally, a color of the shielding pattern 5 is black, and a color of the reference mark 9 is white. A width d1 of the reference mark 9 ranges from 100 µm to 200 µm.

Step 203, calculating a position distance between an outer edge of the reference mark 9 and the edge of the OGS substrate corresponding to the outer edge of the reference mark 9 based on the identified edges of the reference mark and the OGS substrate.

In the step 203, the position distance d3 between the outer edge of the reference mark 9 and the edge of the OGS substrate corresponding to the outer edge of the reference mark 9 is calculated based on an image obtained by the CCD.

In this disclosure, a position of the reference mark 9 on the shielding pattern 5 is preset, the position distance d3 between the outer edge of the reference mark 9 and the edge of the OGS substrate corresponding to the outer edge of the reference mark 9 may reflect an amplitude of the grinding amount to some extent. During the grinding, with the grinding amount increasing, the position distance d3 between the outer edge of the reference mark 9 and the edge of the OGS substrate corresponding to the outer edge of the reference mark 9 is gradually decreased.

Step 204, judging whether the position distance is smaller than a first distance.

In the step 204, in a case that it is judged that the position distance d3 is smaller than the first distance, it is indicated that the grinding amount is enough, so the grinding is stopped. In a case that it is judged that the position distance d3 is larger than or equal to the first distance, it is indicated that the grinding amount is insufficient, it is needed to continue to grind, that is, the above step 201 is performed again.

It should be noted that the first distance may be set accordingly as required so as to ensure that an inner edge of the chamfer 10 may be in contact with the edge of the shielding pattern 5. For example, it is assumed that a distance d2 between the reference mark 9 and the outer edge of the shielding pattern 5 before the grinding is L1, a width d4 of the chamfer 10 is L2, then the first distance may be L1+L2.

It can be seen from above that, during the grinding, by obtaining the position distance d3 between the reference mark 9 and the corresponding edge of the OGS substrate, the grinding amount of the OGS substrate may be monitored.

It is should be noted that, in the disclosure, after the CNC grinding process is completed, a second screen printing process may be skipped over and a strengthening process of the OGS substrate may be directly performed.

Third Embodiment

Figure 9:
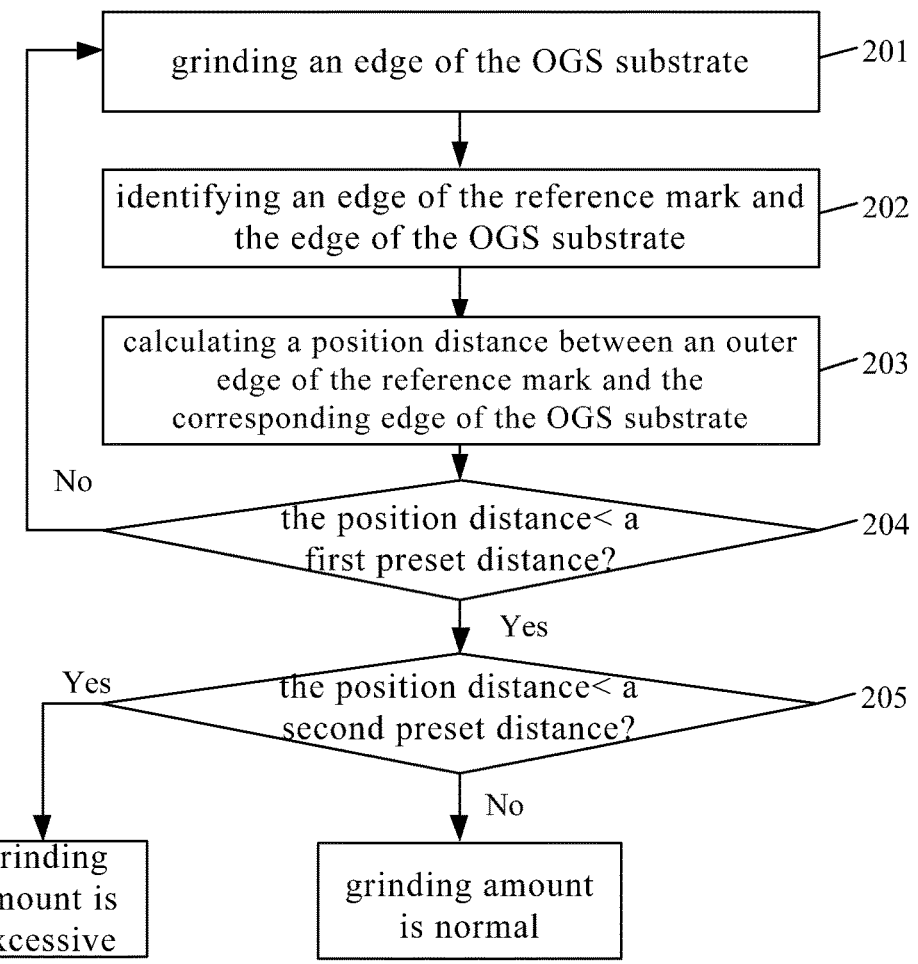
FIG. 9 is a flow chart of a grinding method provided in a third embodiment of the present disclosure.

FIG. 9 is a flow chart of a grinding method provided in a third embodiment of the present disclosure. As shown in FIG. 9, the grinding method not only includes the step 201 to the step 204, but also includes a step 205. The step 205 will be described in detail below.

In a case that it is judged that the position distance is smaller than the first distance in the step 204, performing the step 205.

Step 205, judging whether the position distance is smaller than a second distance.

The second distance is smaller than the first distance. It should be noted that the second distance may be set accordingly as required so as to ensure that an inner edge of the chamfer 10 may be in contact with the edge of the shielding pattern 5, while the grinding amount of the shielding pattern 5 cannot be excessive (ensuring the size of the OGS substrate to meet the production requirements). For example, it is assumed that a distance d2 between the reference mark 9 and the outer edge of the shielding pattern 5 before the grinding is L1, a width d4 of the chamfer 10 is L2, then the second distance may be L1+L2−50 µm.

In the step 205, in a case that it is judged that the position distance d3 is larger than or equal to the second distance, it is identified that the grinding amount of the OGS substrate is normal. In a case that it is judged that the position distance d3 is smaller than the second distance, it is identified that the grinding amount of the OGS substrate is excessive.

It can be seen from above that, by the grinding method in this embodiment, not only the grinding amount of the OGS substrate can be monitored, but also whether or not the grinding amount is excessive can be judged timely.

Fourth Embodiment

Figure 10:
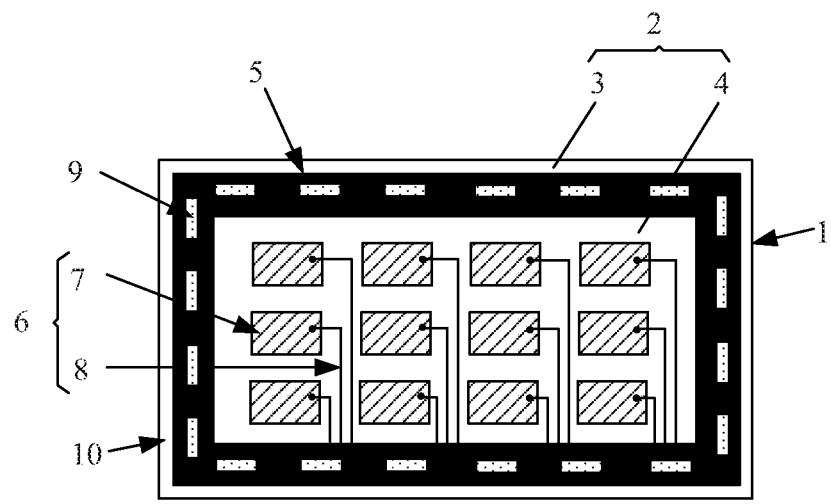
FIG. 10 is a structural diagram of an OGS substrate provided in a fourth embodiment of the present disclosure.
Figure 11:
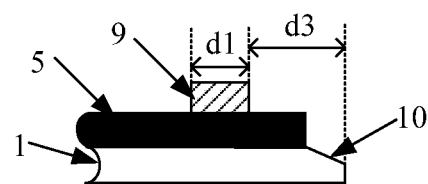
FIG. 11 is a cross sectional diagram showing a periphery region on one side of the OGS substrate shown in FIG. 10.

FIG. 10 is a structural diagram of an OGS substrate provided in a fourth embodiment of the present disclosure, and FIG. 11 is a cross sectional diagram showing a periphery region 3 on one side of the OGS substrate shown in FIG. 10. As shown in FIGS. 10 and 11, the OGS substrate may be obtained by cutting the OGS mother substrate manufactured by the method provided in the first embodiment and grinding the cut OGS substrate by the grinding method provided in the second or third embodiment.

The OGS substrate comprises a base substrate 1, a touch structure 6 is formed in a central region 4 of the base substrate 1; and a shielding pattern 5 is formed in a periphery region 3 of the base substrate 1. A reference mark 9 is formed above the shielding pattern 5, and a color of the reference mark 9 is different from that of the shielding pattern 5. An orthographic projection of the reference mark 9 on the base substrate falls into an orthographic projection of the shielding pattern 5 on the base substrate. A chamfer 10 is formed at an edge of the base substrate 1; and a position distance d3 between an outer edge of the reference mark 9 and an edge of the OGS substrate (base substrate 1) corresponding to the outer edge of the reference mark 9 is within a first range.

In this embodiment, a minimum value of the first range is the second distance in the above third embodiment, and a maximum value of the first range is the first distance in the above third embodiment. Optionally, the second distance may be 200 µm, and the first distance may be 250 µm, that is, the first range may be from 200 µm to 250 µm.

Optionally, a width d1 of the reference mark 9 ranges from 100 µm to 200 µm.

Optionally, a color of the shielding pattern 5 is black, and a color of the reference mark 9 is white.

Optionally, the reference mark 9 is of a multilayer structure of MoAlMo.

Optionally, the touch structure 6 includes a touch electrode 7 and a metal wire 8 connected to the touch electrode 7, and wherein the reference mark 9 is provided in a same layer as the metal wire 8. In this case, the reference mark 9 and the metal wire 8 may be formed through a single patterning process.

Optionally, the reference mark 9 is of a dispersion structure including a plurality of sub-marks separated from each other. The reference mark 9 in the dispersion structure facilitates the dispersion of the electrostatic on the OGS substrate.

This disclosure has following advantages.

This disclosure provides a grinding method, an OGS substrate and a manufacturing method of an OGS mother substrate, wherein the grinding method comprises: grinding an edge of the base substrate so as to form a chamfer; identifying an edge of the reference mark and the edge of the base substrate; calculating a position distance between an outer edge of the reference mark and the edge of the base substrate corresponding to the outer edge of the reference mark based on the identified edges of the reference mark and the base substrate; judging whether the position distance is smaller than a first distance; in a case that it is judged that the position distance is smaller than the first distance, stopping grinding; and in a case that it is judged that the position distance is larger than or equal to the first distance, continuing to grind the edge of the base substrate. The solutions in this disclosure can monitor the grinding amount of the OGS substrate by forming the reference mark, a color of which is different from that of the shielding pattern, on the shielding pattern, and obtaining the position distance between the outer edge of the reference mark and the edge of the OGS substrate corresponding to the edge of the reference mark during the CNC grinding process.

It should be understood that, the foregoing embodiments are only exemplary embodiments used for explaining the principle of the present invention, but the present invention is not limited thereto. Various variations and improvements may be made by a person skilled in the art without departing from the protection scope of the present invention, and these variations and improvements also fall into the protection scope of the present invention.

The invention claimed is:

1. An OGS substrate comprising:
 a base substrate including a central region and a periphery region;
 a touch structure formed in the central region;
 a shielding pattern formed in the periphery region; and
 a reference mark formed above the shielding pattern, wherein
 a color of the reference mark is different from that of the shielding pattern;
 an orthographic projection of the reference mark on the base substrate falls into an orthographic projection of the shielding pattern on the base substrate;
 a chamfer is formed at an edge of the base substrate; and
 a position distance between an outer edge of the reference mark and the edge of the base substrate corresponding to the outer edge of the reference mark is within a first range.

2. The OGS substrate of claim 1, wherein a width of the reference mark ranges from 100 μm to 200 μm.

3. The OGS substrate of claim 1, wherein a color of the shielding pattern is black, and a color of the reference mark is white.

4. The OGS substrate of claim 1, wherein the reference mark is of a multilayer structure of MoAlMo.

5. The OGS substrate of claim 1, wherein the touch structure includes a touch electrode and a metal wire connected to the touch electrode, and wherein
 the reference mark is provided in a same layer as the metal wire.

6. The OGS substrate of claim 1, wherein the reference mark includes a plurality of sub-marks separated from each other.

7. The OGS substrate of claim 1, wherein the first range is from 200 μm to 250 μm.

8. A grinding method of an edge of an OGS substrate of claim 1, comprising:
 grinding an edge of the base substrate so as to form a chamfer;
 identifying an edge of the reference mark and the edge of the base substrate;
 calculating a position distance between an outer edge of the reference mark and the edge of the base substrate corresponding to the outer edge of the reference mark based on the identified edges of the reference mark and the base substrate;
 judging whether the position distance is smaller than a first distance;
 in a case that it is judged that the position distance is smaller than the first distance, stopping grinding; and in a case that it is judged that the position distance is larger than or equal to the first distance, continuing to grind the edge of the base substrate.

9. The grinding method of claim 8, further comprising:
 after it is judged that the position distance is smaller than the first distance, judging whether the position distance is smaller than a second distance, wherein the second distance is smaller than the first distance, wherein
 in a case that it is judged that the position distance is larger than or equal to the second distance, it is identified that a grinding amount of the OGS substrate is normal, and in a case that it is judged that the position distance is smaller than the second distance, it is identified that the grinding amount of the OGS substrate is excessive.

10. The grinding method of claim 8, wherein a width of the reference mark ranges from 100 μm to 200 μm.

11. The grinding method of claim 8, a color of the shielding pattern is black, and a color of the reference mark is white.

* * * * *